W. R. SMITH.
Combined Land Roller and Harrow.
No. 220,184. Patented Sept. 30, 1879.
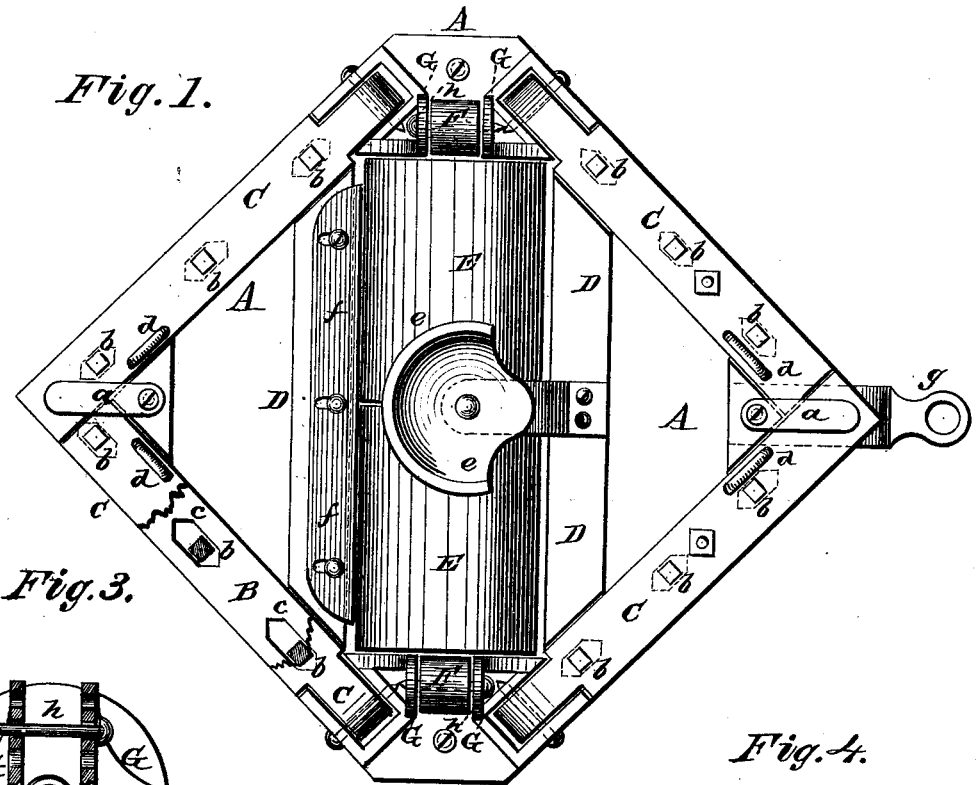
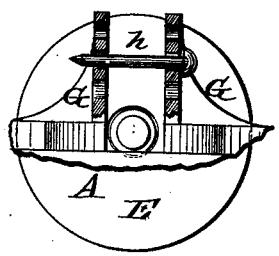
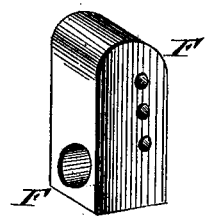
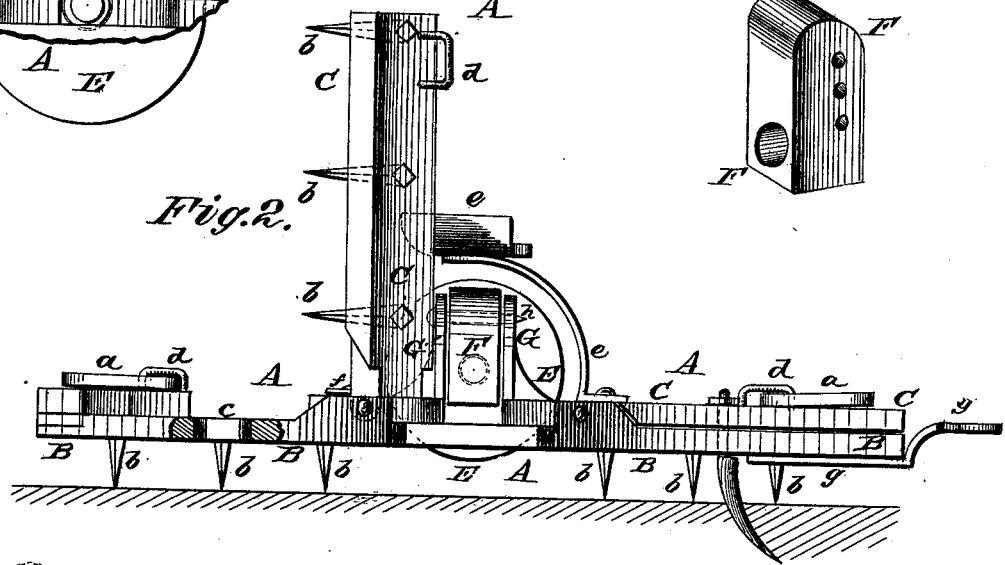

UNITED STATES PATENT OFFICE.

WILLIAM R. SMITH, OF DALLAS, TEXAS.

IMPROVEMENT IN COMBINED LAND-ROLLER AND HARROW.

Specification forming part of Letters Patent No. 220,184, dated September 30, 1879; application filed July 19, 1879.

*To all whom it may concern:*

Be it known that I, WILLIAM R. SMITH, of Dallas, in the county of Dallas and State of Texas, have invented certain new and useful Improvements in Combined Land-Roller and Harrow; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to a combined land-roller and harrow, and in the combination and arrangement of parts, as will be hereinafter more fully set forth, and pointed out by the claim.

In the annexed drawings, which fully illustrate my invention, Figure 1 is a plan view. Fig. 2 is a side elevation, and Figs. 3 and 4 are detail views, of my invention.

Like letters of reference indicate like parts.

A represents the frame, composed of the lower rigid portion, B, and upper pivoted portions, C, the bars C being pivoted at one end near the journal-bearings of the roller, and are held in place at their other end by buttons $a$. To the under side of the bars C are secured, in any suitable manner, the harrow-teeth $b$, and in the bars B are placed openings $c$, through which said teeth pass. Suitable handles $d$ are placed upon the outer ends of the bars C to admit of their being swung upward on their pivots by the operator for the purpose of cleaning the teeth.

D represents cross-bars, the forward one of which has a seat, $e$, and the rear one a scraper, $f$, secured thereto, the said scraper being for the purpose of cleaning the dirt from the rollers that accumulates during their revolution.

$g$ represents a suitable clevis by which the device is drawn.

E represents the rollers, of which there may be any desired number, and working upon suitable journals in the bearings F. Said journal-bearings are perforated for the purpose, as will hereinafter be shown.

G represent standards attached to the rigid portion of the frame, and adapted to receive the journal-bearings F. These standards are provided with perforations corresponding with the perforations in the bearings F. When it is desired to adjust the rollers, the same is done by means of a pin, $h$, passed through the standards and bearings, as shown, whereby the rollers can be raised or lowered, as desired.

The harrow-teeth may, if desired, be removed from the bar C, and small cultivator-teeth substituted for sowing grain; or the teeth may be taken out, leaving the roller alone, or vice versa. Any size roller may be used, if desired.

The parts C of the frame may be pivoted as shown, or they may be pivoted to the front and rear ends of the machine, if desired.

Having thus fully described my invention, what I claim as new, and desire to secure by Letters Patent, is—

The frame A, composed of part B, with openings $c$, and part C, pivoted to the part B, and provided with the teeth $b$, in combination with the handles $d$ and button $a$, for the purpose set forth.

In testimony that I claim the foregoing as my own I have hereto affixed my signature in presence of two witnesses.

WILLIAM ROBERT SMITH.

Witnesses:
MICHAEL ROE,
WM. P. BARLOW.